J. PERKINS.
Egg-Carriers.
No. 154,517.
Patented Aug. 25, 1874.
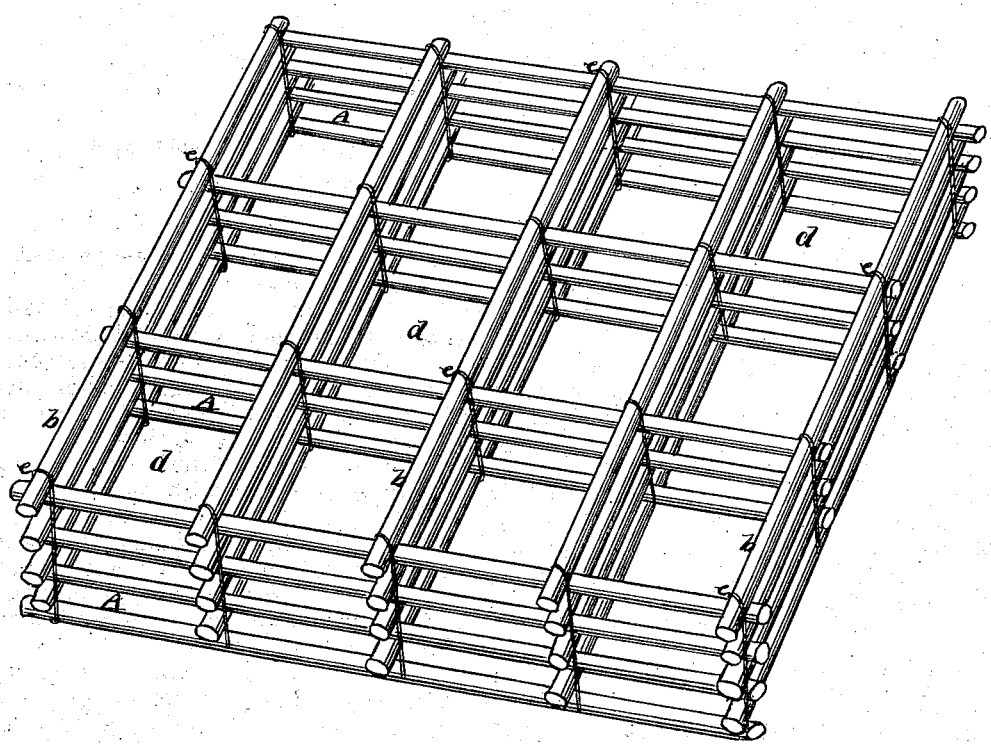
Witnesses
John L. Borne
C. M. Richardson
Inventor
Joseph Perkins
by Dewey & Co
Attys

UNITED STATES PATENT OFFICE.

JOSEPH PERKINS, OF SAN FRANCISCO, CALIFORNIA.

IMPROVEMENT IN EGG-CARRIERS.

Specification forming part of Letters Patent No. 154,517, dated August 25, 1874; application filed May 20, 1874.

*To all whom it may concern:*

Be it known that I, JOSEPH PERKINS, of San Francisco city and county, State of California, have invented Improvement in Egg-Carriers; and I do hereby declare the following description and accompanying drawings are sufficient to enable any person skilled in the art or science to which it most nearly appertains to make and use my said invention or improvement without further invention or experiment.

My invention consists in a holder or receptacle for transportation of eggs and other fragile articles, made of woven stalks of a spongy rush known as the tule-grass, (*Scirpus lacustris.*)

To make the carriers, I take the rushes or tule-stalks and cut them in lengths according to the size of the carrier to be made. I then place a number of the cut stalks, A, parallel with each other, and at a distance apart equal to the desired width of the compartments to be formed, and upon these I place other lengths, b, at right angles to the first series, thus forming a number of square or other shaped compartments, d, of the desired size. I then continue placing the stalks upon each other until I obtain the desired height of frame, or rather depth of compartment. To secure these stalks in place I employ fine wire, e, with which I bind the crossed ends and other crossed portions of the stalks by wrapping the wire around them and twisting their ends together; or a wire rod could be passed through them and fastened or bent at each end. Any desired style of fastening can be used.

These tule-stalks provide a soft elastic bed for the eggs to lie in without danger of being broken.

Bottles and fragile ware can also be packed in frames constructed in a similar manner.

Having thus described my invention, what I claim, and desire to secure by Letters Patent, is—

As a new article of manufacture, a receptacle for the transportation of eggs and other fragile articles, made of the stalks of the *Scirpus lacustris*, interwoven to form compartments, substantially as set forth.

In witness whereof I hereunto set my hand and seal.

JOS. PERKINS. [L. S.]

Witnesses:
 JNO. L. BOONE,
 C. M. RICHARDSON.